(12) United States Patent
Housley (10) Patent No.: US 10,039,420 B2
(45) Date of Patent: Aug. 7, 2018

(54) SINK COLANDER AND STORAGE ASSEMBLY

(71) Applicant: Lexical Technologies, Inc., McKinney, TX (US)

(72) Inventor: Todd B. Housley, McKinney, TX (US)

(*) Notice: Subject to any disclaimer, the term of this patent is extended or adjusted under 35 U.S.C. 154(b) by 905 days.

(21) Appl. No.: 14/457,887

(22) Filed: Aug. 12, 2014

(65) Prior Publication Data
US 2014/0346102 A1    Nov. 27, 2014

Related U.S. Application Data

(63) Continuation-in-part of application No. 12/875,611, filed on Sep. 3, 2010, now Pat. No. 8,801,926.

(51) Int. Cl.
| | | |
|---|---|---|
| B01D 35/027 | (2006.01) | |
| A47J 47/18 | (2006.01) | |
| A47J 47/20 | (2006.01) | |
| A47J 43/24 | (2006.01) | |

(52) U.S. Cl.
CPC .............. *A47J 43/24* (2013.01); *A47J 47/18* (2013.01); *A47J 47/20* (2013.01); *B01D 35/027* (2013.01); *Y10T 29/49716* (2015.01)

(58) Field of Classification Search
None
See application file for complete search history.

(56) References Cited

U.S. PATENT DOCUMENTS

| | | |
|---|---|---|
| 160,540 A | 3/1875 | Murdock |
| 981,448 A | 1/1911 | Matthews |
| 2,309,851 A | 2/1943 | Kuhne |
| 2,691,237 A | 10/1954 | Hawley |
| 3,625,162 A | 12/1971 | Crew |
| 3,742,965 A | 7/1973 | Hudziak |
| 4,033,461 A | 7/1977 | Nevai |
| 4,456,021 A | 6/1984 | Leavens |

(Continued)

FOREIGN PATENT DOCUMENTS

| | | |
|---|---|---|
| EP | 1442691 A1 | 8/2004 |
| JP | 2003020707 A | 1/2003 |
| JP | 2010035749 A | 2/2010 |

OTHER PUBLICATIONS

Power Lock Suction SinkWorks Sponge and Scrubber Combo found at http://www.amazon.com/Rubbermaid-1G15M6FRST-Evolution-Divider-Frost/dp/B000IZANR2, Aug. 1, 2011.

(Continued)

*Primary Examiner* — Thomas M Lithgow
(74) *Attorney, Agent, or Firm* — Foley & Lardner LLP (57) ABSTRACT

A collapsible colander having a back wall, a front wall, a bottom wall and a pair of side walls. The back wall is positioned adjacent to a sink wall and is configured to attach to the sink wall. The front wall opposes the back wall and is moveable between a first position that is parallel to the back wall and a second position. The bottom wall has a number of apertures formed therethrough and has at least a first position that is substantially perpendicular to the back wall. The pair of side walls each have a first edge connected to the front wall and a second edge connected to the back wall. Additionally, the pair of side walls each have two or more hinges operable to move the front wall between at least the first position and the second position.

20 Claims, 12 Drawing Sheets

(56) References Cited

U.S. PATENT DOCUMENTS

| | | |
|---|---|---|
| D324,902 S | 3/1992 | Kohler, Jr. et al. |
| 5,181,285 A | 1/1993 | Kolada |
| 5,217,123 A | 6/1993 | Riley et al. |
| D338,261 S | 8/1993 | Kolada |
| 5,279,007 A | 1/1994 | Kolada |
| 5,590,804 A | 1/1997 | Crum et al. |
| 5,715,547 A | 2/1998 | Becker et al. |
| 5,823,366 A | 10/1998 | Bellamy |
| 5,865,325 A | 2/1999 | Comstock |
| 6,039,887 A | 3/2000 | Licari |
| 6,276,675 B1 | 8/2001 | Shamoon |
| 6,341,704 B1 | 1/2002 | Michel, Jr. |
| 6,508,368 B1 | 1/2003 | Arce, Jr. |
| 6,547,080 B1 | 4/2003 | Guard |
| 6,698,464 B2 | 3/2004 | Hennemann, Jr. et al. |
| 6,783,674 B2 | 8/2004 | Iannizzotto et al. |
| D558,535 S | 1/2008 | Curtin |
| D558,538 S | 1/2008 | Curtin |
| D595,914 S | 7/2009 | Housley |
| 7,678,271 B2 | 3/2010 | Curtin |
| 8,801,926 B2 * | 8/2014 | Housley .............. A47J 47/20 210/232 |
| 2004/0250345 A1 | 12/2004 | Kaster |
| 2008/0230462 A1 * | 9/2008 | Curtin .............. A47J 43/24 210/232 |
| 2010/0251906 A1 | 10/2010 | Repp et al. |

OTHER PUBLICATIONS

Clear Saddlebag Sink Tray/Basket found at http://www.hangercity.com/sador.html, Aug. 1, 2011.

Simplehuman Sink Caddy, Stainless Steel found at http://www.amazon.com/Simplehuman-Sink-Caddy-Stainless-Steel/dp/B002WGHKWQ/ref=pd_sbs_hg_21, Aug. 1, 2011.

OXO Good Grips Suction Large Basket found at http://www.amazon.com/Oxo-Grips-1213400-Suction-Basket/dp/B00179DLWC/ref=pd_sbs_hg_52, Aug. 1, 2011.

Rubbermaid Evolution Snk Divider Mat found at http://www.amazon.com/Rubbermaid-1G15M6FRST-Evolution-Divider-Frost/dp/B000IZANR2, Aug. 1, 2011.

Adjustable Dish Brush and Spong Holder found at http://www.amazon.com/Adjustable-Dish-Brush-Sponge-Holder/dp/B001YHTWFC/ref=pd_sbs_hg_29, Aug. 1, 2011.

Flat Fold Colander found at http://www.aliexpress.com/product-fm/334191129-Flat-Fold-Colander-Folding-colander-as-seen-on-tv-items-with-free-shipping-wholesalers.html, Aug. 1, 2011.

International Search Report for Co-Pending PCT Application No. PCT/US2011/049457 dated Mar. 26, 2012.

Written Opinion dated Mar. 14, 2013 in corresponding application No. PCT/US2011/049457.

* cited by examiner

SINK COLANDER AND STORAGE ASSEMBLY

CROSS REFERENCE TO RELATED APPLICATIONS

This application is a continuation-in-part of U.S. patent application Ser. No. 12/875,611 entitled "Sink Colander and Storage Assembly," filed Sep. 3, 2010, which is hereby incorporated by reference for all purposes.

BACKGROUND

Colanders of various sizes and shapes are commonly used to rinse foods such as fruits, vegetables, pasta and the like. However, such colanders are difficult to handle during use and can consume large amounts of space. For example, many colanders require the user to either manually hold the colander over a sink or otherwise balance it on the countertop. This oftentimes results in inadvertent spilling of the contents from the colander basket if balance is not adequately maintained and/or the user drops the colander. Furthermore, when not in use, such colanders are inconvenient to store in a compact fashion.

SUMMARY

In a first aspect a collapsible colander is presented having a back wall, a front wall, a bottom wall and a pair of side walls. The back wall is positioned adjacent to a sink wall and is configured to attach to the sink wall. The front wall opposes the back wall and is moveable between a first position that is parallel to the back wall and a second position. The bottom wall has a number of apertures formed therethrough and has at least a first position that is substantially perpendicular to the back wall. The pair of side walls each have a first edge connected to the front wall and a second edge connected to the back wall. Additionally, the pair of side walls each have two or more hinges operable to move the front wall between at least the first position and the second position.

In a second aspect, a collapsible colander system for connecting to a sink wall includes a support member operable to connect to at least a portion of the sink wall and a collapsible colander. The collapsible colander includes a back wall attachable to the support member, a retractable front wall having a plurality of apertures formed therethrough, and a bottom wall having a number of apertures formed therethrough, such that the bottom wall has a first edge attached to the back wall and an opposing second edge attached to the retractable front wall. The collapsible colander further includes a pair of foldable wings connected to and positioned between the back wall and the front wall. The wings are operable to fold from a first position into a second position, causing the retractable front wall to be positioned perpendicular to the back wall, and responsive to the wings folding into the second position, the wings are operable to fold into a third position, causing the retractable front wall to be positioned parallel and adjacent to the back wall.

In a third aspect, a collapsible colander system for connecting to a sink wall includes a support member operable to connect to at least a portion of the sink wall and a collapsible colander. The collapsible colander includes a back wall attachable to the support member, a retractable front wall having a plurality of apertures formed therethrough, and a bottom wall having a number of apertures formed therethrough. The bottom wall has a first edge attached to the back wall and an opposing second edge attached to the retractable front wall. The collapsible colander further includes a pair of foldable side walls connected to and positioned between the back wall and the front wall. The side walls are operable to fold from a first position into a second position, positioning the front wall into a shelf substantially horizontal to a sink bottom, and a third position wherein the third position is a collapsed position such that the front wall is positioned adjacent to the back wall.

In a fourth aspect, a method for collapsing a colander having a back wall, a bottom wall, a front wall, and a pair of side walls having two or more folding scores, includes the following steps: bending at least one of the folding scores on each of the pair of side walls, responsive to pushing the front wall toward the bottom wall; positioning the front wall adjacent the bottom wall; and responsive to the front wall being positioned adjacent the bottom wall, and responsive to pushing the front wall and the bottom wall toward the back wall, bending at least another of the folding scores on each of the pair of side walls; wherein the front wall, the bottom wall and the back wall are substantially parallel and in a collapsed position.

DETAILED DESCRIPTION

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 1:
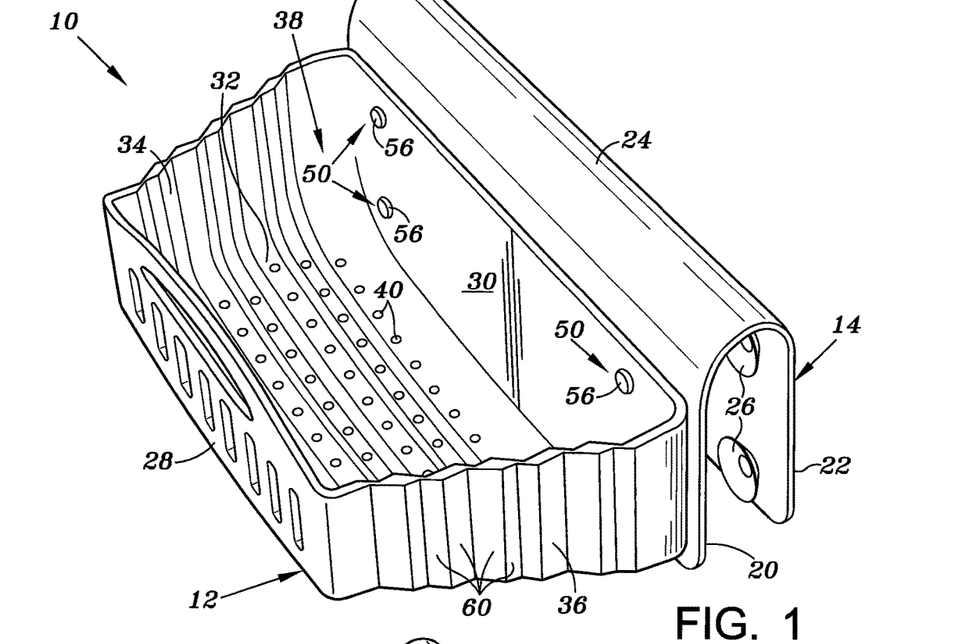
FIG. 1 is a diagram of a sink colander and storage assembly in which a removable and collapsible basket device is employed to advantage.
Figure 2:
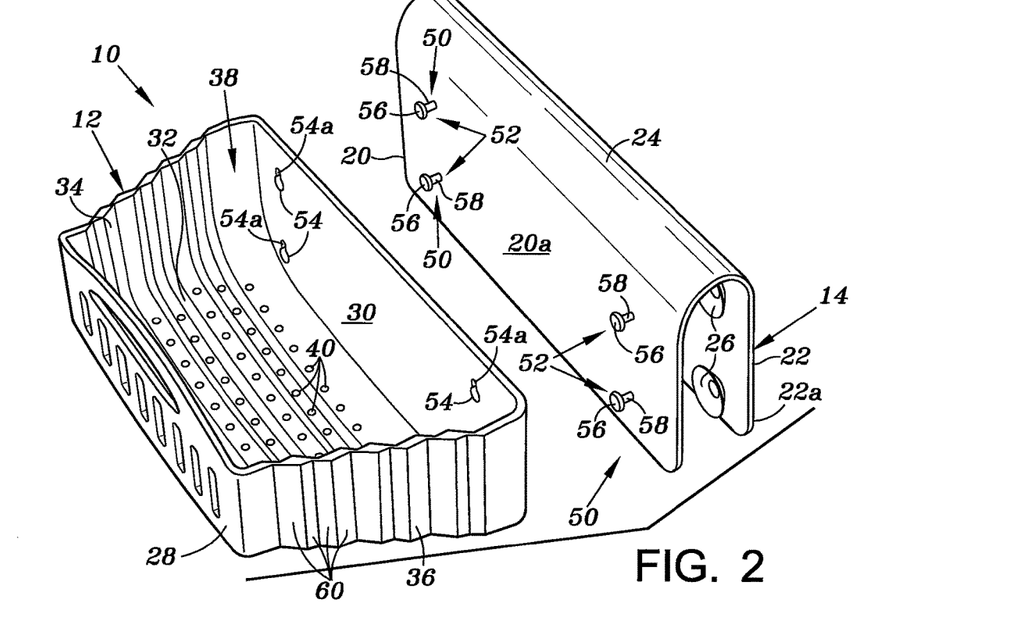
FIG. 2 is a diagram of the sink colander and storage assembly of FIG. 1 illustrating the basket device detached from a storage assembly base member.
Figure 3:
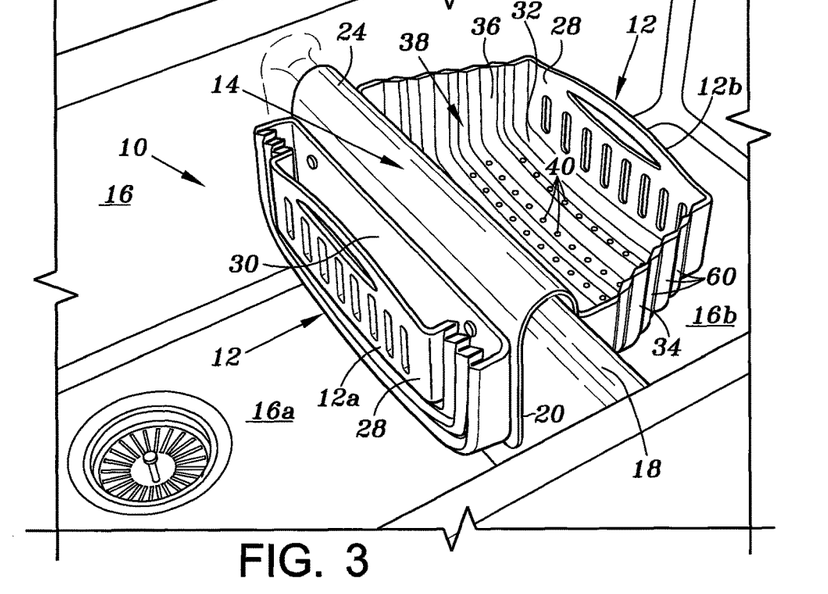
FIG. 3 is a diagram of the sink colander and storage assembly of FIGS. 1 and 2 illustrating a first basket device in a collapsed position and a second basket device in an extended or use position.
Figure 4:
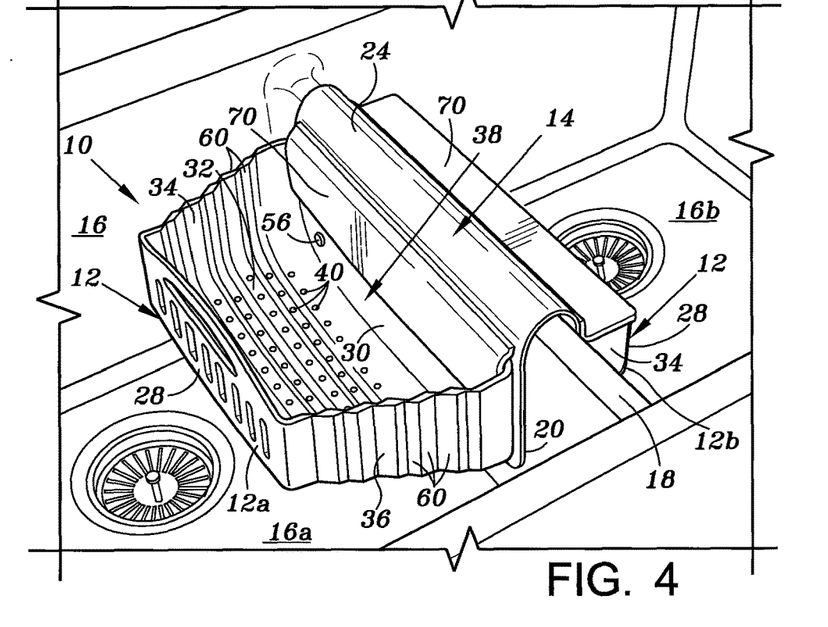
FIG. 4 is a diagram of the sink colander and storage assembly of FIGS. 1-3 employing a cover.

FIGS. 1 and 2 are diagrams illustrating a sink colander and storage assembly 10 in which a removable and collapsible basket device 12 is employed to advantage. In the embodiment illustrated in FIGS. 1 and 2, storage assembly 10 comprises a base member 14 to releasably support basket device 12 within a sink 16 (FIGS. 3 and 4). For example, in the embodiment illustrated in FIG. 3, base member 14 is fastened to a sink divider 18 such that basket device 12 can be secured thereto and extend within sink 16. In FIGS. 1 and 2, basket device 12 is a colander to enable a user to rinse fruits and vegetables, drain pastas and other foods, and/or place any other type of content (silverware, etc.) within colander 12 for rinsing, draining, storage or otherwise. In addition, while storage assembly 10 is illustrated within a sink 16, it should be understood that storage assembly 10 may be otherwise used, such as, for example, in a bathtub or shower area. As explained in further detail below, embodiments further provide a storage assembly 10 having a basket device 12 configured between a collapsed position (FIG. 3) for storage thereof or an extended or use position (FIGS. 1, 2 and 4).

Preferably, base member 14 is formed of a flexible sheet of polymeric material; however, it should be understood that any material may be used. Referring specifically to FIG. 2, base member 14 comprises a generally rectangular and foldable sheet having a first attachment section 20 and corresponding surface 20a, a second attachment section 22 and corresponding surface 22a, and a hinged section 24 connecting the first and second sections 20 and 22. Referring specifically to FIGS. 2-4, hinged section 24 is disposed over sink divider 18 to enable first section 20 to rest within sink area 16a and to enable second section 22 to rest within second sink area 16b.

In the embodiment illustrated in FIGS. 1-4, base member 14, and in particular, first and second sections 20 and 22, are secured to sink divider 18 via one or more suction cups 26. In particular, sections 20 and 22 each comprise one or more suction cups 26 disposed thereon so as to securely fasten base member 14 to both sides of sink divider 18. It should be understood, however, that base member 14 may be otherwise connected to sink 16, such as, for example, via an adhesive, frictional engagement, magnetically or otherwise.

Basket device 12 includes a front wall 28, a rear wall 30, a bottom wall 32 and a pair of sidewalls 34 and 36 forming a basket or storage area 38. Bottom wall 32 optionally includes openings 40 therein to facilitate drainage from basket area 38 and into sink 16 in the event basket device is used as a rinsing device or colander, for example.

Embodiments provided herein enable basket device 12 to be removed or otherwise detached from base member 14. For example, when it is necessary to clean basket device 12, a user can easily detach basket device 12 from base 14. Preferably, base member 14 comprises a locking system 50 (FIG. 2), which is used to securely fasten basket device 12 to base member 14. Briefly, locking mechanism 50 includes one or more extensions 52 extending from sections 20 and 22 that are sufficiently spaced apart to align with and otherwise engage corresponding openings 54 disposed on rear wall 30 of basket device 12. In the embodiment illustrated in FIGS. 1 and 2, locking system 50 comprises four extensions 52 disposed generally adjacent to corners of each section 20 and 22; however, it should be understood that a greater or fewer number of extensions 52 and corresponding openings 54 may be utilized.

Referring specifically to FIG. 2, each extension 52 comprises a boss 56 disposed on a post 58. Each boss 56 and post 58 are sized so as to be insertable within a respective opening 54 to enable post 58 to otherwise engage upper portion 54a of opening 54. Thus, when post 58 is disposed within upper portion 54a, boss 56, which contains a larger diameter relative to the diameter of upper portion 54a of opening 54, prevents or otherwise resists lateral removal of basket device 12 from base member 14. When coupling basket device 12 to base member 14, openings 54 are aligned with and are otherwise positioned to receive boss 56. Once inserted, basket device 12 is lowered such that posts 58 rest within upper portions 54a of openings 54. It should be understood that colander 12 may be otherwise attached to base member 14, such as, for example, via a snap or a friction fit, via a hook and loop fastener, magnetically or by any other means.

Referring specifically to FIG. 3, storage assembly 10 contains two basket devices 12a and 12b disposed within respective sink areas 16a and 16b. As illustrated in FIG. 3, basket device 12a is configured in a collapsed or stored position and basket device 12b in configured in an extended or use position. Accordingly, in lieu of detaching basket device 12a from base member 14 during periods of non-use, colander 12a can be configured in a collapsed position and remain coupled to base member 14 without obstructing or otherwise preventing access to sink 16a.

Preferably, when basket device 12 is configured in a collapsed or stored position, basket device 12 extends outward approximately 1.5 inches. When basket device 12 is configured in the extended or use position, basket device 12 extends outward approximately 5 inches.

In the embodiment illustrated in FIGS. 1-4, sidewalls 34 and 36 and bottom wall 32 are formed of foldable accordion-like segmented portions 60 such that when colander 12 is configured in the collapsed/stored position, segmented portions 60 are adjacently positioned in a folded configuration. In the embodiment illustrated in FIG. 4, base 14 may optionally contain a flexible cover 70 so as to cover or otherwise prevent water and other debris from entering into basket area 38 when colander 12 is in the stored position. As colander 12 is positioned in the use position, cover 70 folds into basket area 38 to prevent access into basket area 38 to remain clear of and permit unrestricted access.

It should be understood that while storage assembly 10 is illustrated disposed over sink divider 18, it should be understood that base 14 may be otherwise formed or sized so as to be secured directly to any sidewall of sink 16. For example, base member 14 may be formed solely of section 20 having suction cups 26 coupled thereto for attaching a sidewall of sink 16. Likewise, basket device 12 may incorporate suction cups 26 disposed directly thereon for direct attachment to any sidewall of sink 16.

Figure 5:
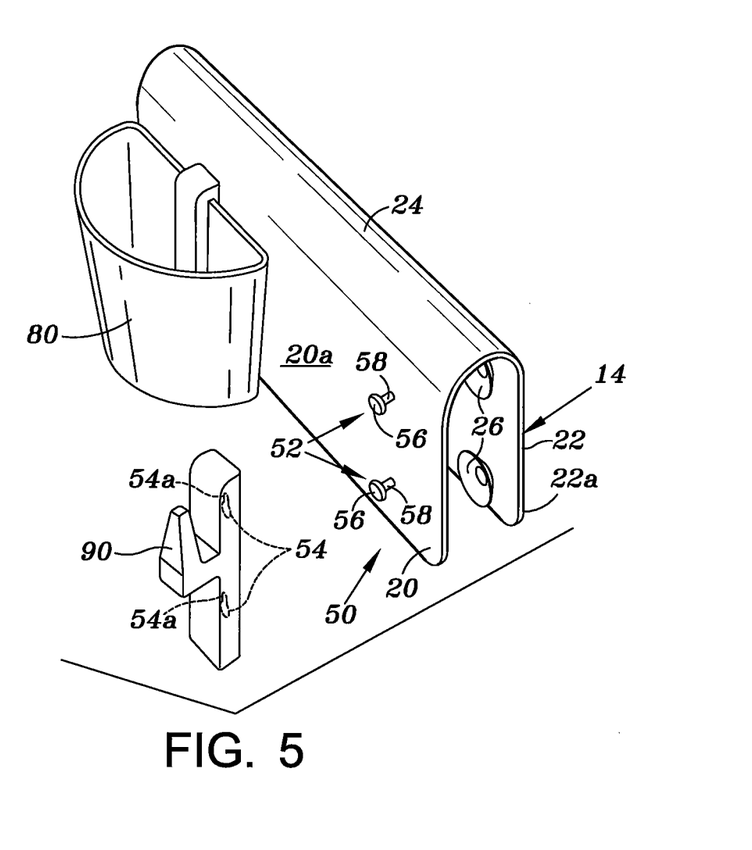
FIG. 5 is a diagram of the storage assembly base member of FIGS. 1-4 used in connection with various removable accessories.

FIG. 5 is a diagram of base member 24 of FIGS. 1-4 used in connection with various removable sink accessories 80 and 90. In FIG. 5, sink accessory 80 comprises a storage compartment or cup for storing items such as a soap container, scrubber brushes or any other object. Sink accessory 90 includes a hook portion to enable scrubber brushes or rags to be mounted thereon. It should be understood that accessories 80 and 90 can be any size or shape. For example, sink accessory 80 can extend substantially along the length of base member 24 for storing larger and/or more items therein. In the embodiment illustrated in FIG. 5, sink accessories 80 and 90 are configured to be removably coupleable to base member 24 via locking system 50.

Although embodiments of the colander assembly 10 have been described in detail, those skilled in the art will also recognize that various substitutions and modifications may be made without departing from the scope and spirit of the appended claims.

Referring primarily to FIG. 6-9F, another embodiment of a collapsible colander system 100 having a colander 112 supported on a sink 116 (FIG. 9A) via a support or base member 114. The collapsible colander 112 includes a back wall 120 attachable to the support member 114, a retractable or foldable front wall 122, a bottom wall 124 having a plurality of apertures 126 formed therethrough, and a pair of foldable wings or sidewalls 128 connected to and extending between the back wall 120 and the front wall 122. The colander 112 is positionable between a first or use/unfolded position (FIG. 9A) and a second or partially folded/collapsed position (FIG. 9B). When in the second position, the sidewalls 128 are partially folded to enable the front wall 122 to overlay the bottom wall 124 so as to be disposed generally perpendicular to the back wall 120 to provide, as discussed in further detail below, a shelf or other support surface. The colander 112 is further positionable in a third or stored/folded position (FIG. 9D), in which the sidewalls 128 are folded to enable the front wall 122 and the bottom wall 124 to be positioned parallel and adjacent to the back wall 120. As discussed in further detail below, the collapsible colander 112 is configurable between a plurality of positions to enable the same colander system 100 to have multiple functions.

As illustrated in FIGS. 6-9F, the support member 114 is a flexible member configured and otherwise formed to conform to and otherwise be supported by a sink divider 118. In the embodiment illustrated in FIGS. 6-9F, the support member 114 is secured to the sink 116 by one or more suction cups 127. For example, the support member 114 may be secured by a single, large suction cup, or a number of suction cups 127 that are affixed to a bottom surface 130 of the support member 114. It should be understood, however, that similar to the support member 14 previously described, the support member 114 may be otherwise connected to the sink 116, such as, for example, via an adhesive, frictional engagement, magnetically or otherwise. Furthermore, according to some embodiments, the support member 114 may be secured to the sink 116 at any other locations, such as, for example, directly to any other sidewall (i.e., a sidewall other than a wall formed by a divider wall 118) or a corner of the sink 116. According to some embodiments, the support member 114 includes raised ridges or protrusions 135 extending outward from an outer or top surface 129 of the support member 114. In use, the ridges or protrusions 135 provide a raised support surface such that, for example, when a washcloth or other object (not illustrated) rests thereon, the ridges 135 lift the object to provide a gap between the object and the top surface 129 to facilitate drying of the cloth or other object.

According to some embodiments, the colander 112 can be used without the support member 114. In such configurations, suction cups or other types of fastening mechanisms are coupled directly to and extend from the colander 112 to attach the colander 112 to the sink 116. For example, in some embodiments, suction cups are attached directly to the back side 120 of the colander 112, although it should be understood that suction cups can be attached to the front wall 122.

Figure 6:
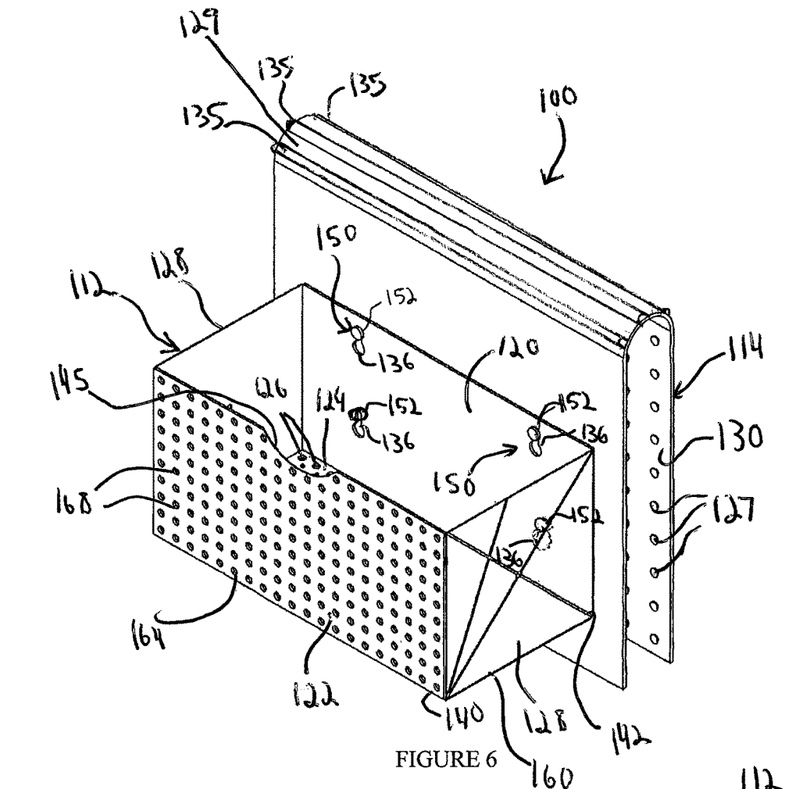
FIG. 6 is a diagram of an embodiment of a sink colander and storage assembly in which a removable and collapsible basket device is illustrated.

Referring primarily to FIG. 6, the colander 112 is secured to the support member 114 via a locking system 150. In addition to securing the colander 112 thereon, the locking system 150 facilitates easy removal of the colander 112 from the support member 114 for storage, cleaning or otherwise. In the embodiment illustrated in FIG. 6, the locking system 150 includes one or more extensions 152 extending from the support member 114. In one embodiment, the support member 114 includes four extensions 152 extending therefrom for supporting the colander 112. The extensions 152 also enable the colander 112 to be positioned at different elevations on the support member 114. For example, the four extensions 152 are aligned with and otherwise inserted within the corresponding receivers 136 positioned on or in the colander 112 to position the colander 112 at a predetermined height. However, in another configuration, only the bottom extensions 152 extending from the support member 114 engage or are otherwise disposed within the top receivers 136 of the colander 112 so that the colander 112 rests at a lower elevation in the sink 116. The capability of moving the colander 112 up or down or adding additional support allows the system 100 to be used for a wider range of uses and in a variety of different sink designs.

Figure 7A:
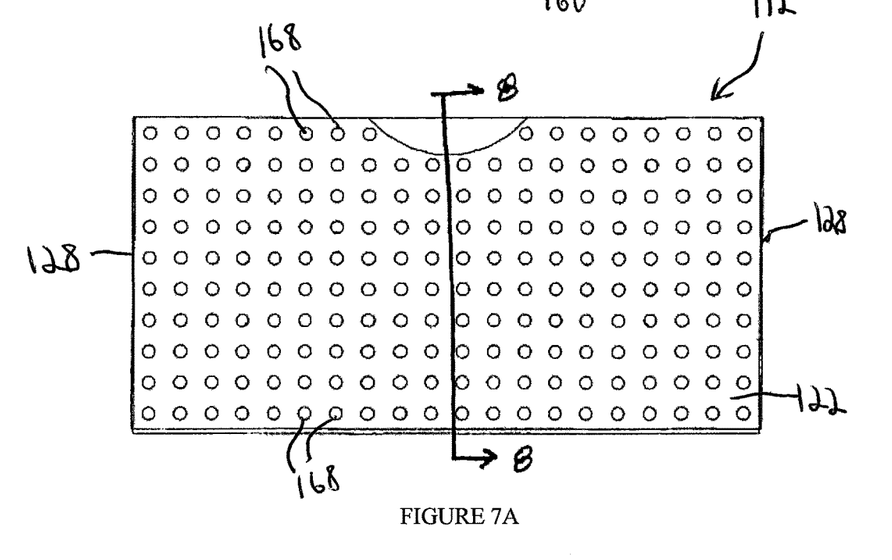
FIG. 7A is a diagram illustrating the front view of the sink colander of FIG. 6.
Figure 7B:
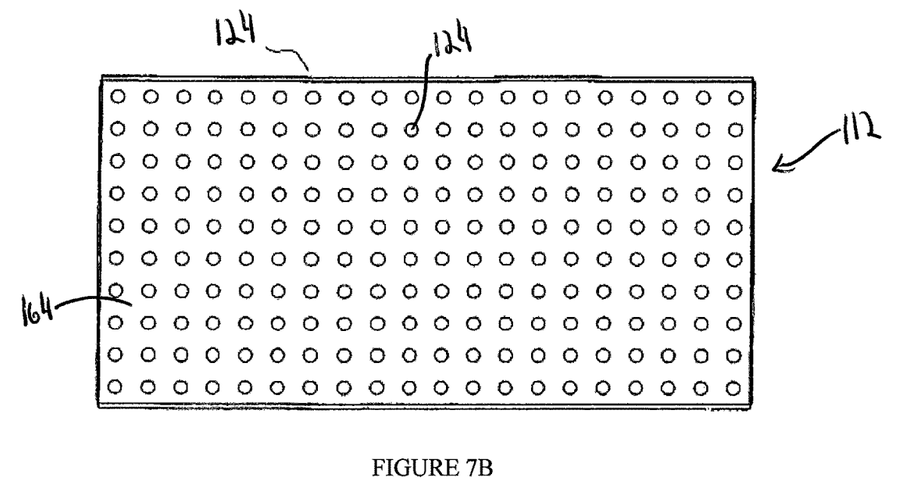
FIG. 7B is a diagram illustrating the bottom view of the sink colander of FIG. 6.
Figure 7C:
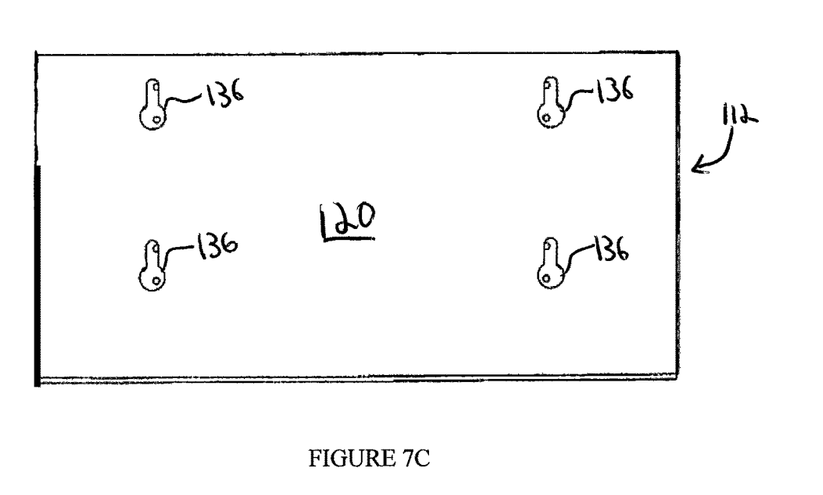
FIG. 7C is a diagram illustrating the back view of the sink colander of FIG. 6.

In the embodiment disclosed in FIG. 6, the extensions 152 are formed having a boss disposed on a post, such as the boss and post 56 and 58 previously described. In some embodiments, the locking system 150 functions similar to the locking system 50. In FIGS. 6 and 7C, the receivers 136 are openings formed in the back wall 120 or may include other types of configurations such as a slot or groove that will allow the extensions 152 to engage and otherwise fit within the receivers 136 and removably lock the colander 112 to the support member 114. However, it should be understood that the receivers may be disposed on any portion of the colander 112.

Figure 7D:
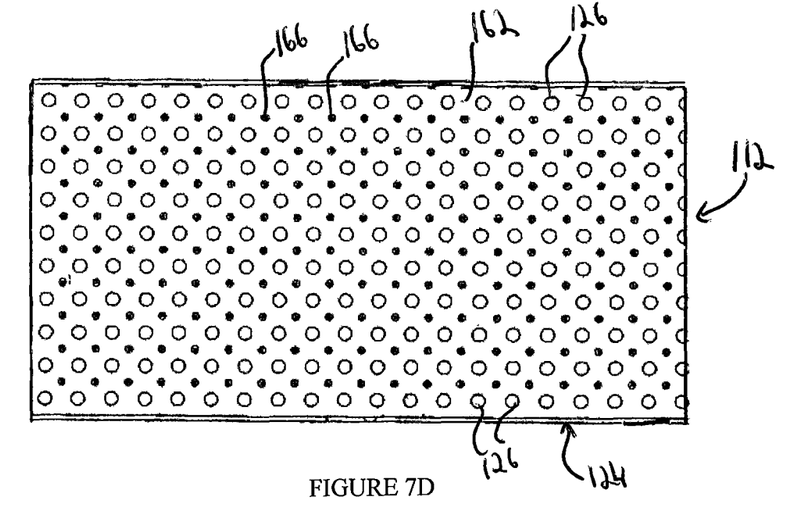
FIG. 7D is a diagram illustrating the top view of the sink colander of FIG. 6.

Referring specifically to FIGS. 6 and 7D, the bottom wall 124 includes a first edge 140 formed along the back wall 120 and an opposing second edge 142 formed along the front wall 122. The bottom wall 124 includes an upper surface or top side 162 and an opposing lower surface or bottom side 164. The bottom wall 124 further includes the apertures 126 extending through the upper and lower surfaces 162 and 164 to allow water or other liquids to drain from the bottom of the colander 112. The apertures 126 may form any pattern, including patterns for decoration or to facilitate drainage. In one aspect, the upper surface 162 of the bottom wall 124 includes protrusions 166 extending from the upper surface 162 of the bottom wall 124 so as to facilitate an airflow around the apertures 126 when in the partially collapsed or fully collapsed positions. For example, when the colander 112 is in the partially collapsed position, the protrusions 166 act to maintain spaced apart relationship between the front wall 122 and the upper surface 162 of the bottom wall 124. In another non-limiting example, the protrusions 166 prevent or substantially eliminate the likelihood of materials from sealing the apertures 126 due to suction forces created as liquid is drained from material in the colander 112. In yet another example, the protrusions 166 may act to help air circulate beneath items placed on the top side surface 162 of the bottom wall 124. This aspect may be beneficial if a user is thawing meat in the colander 112.

Figure 7E:
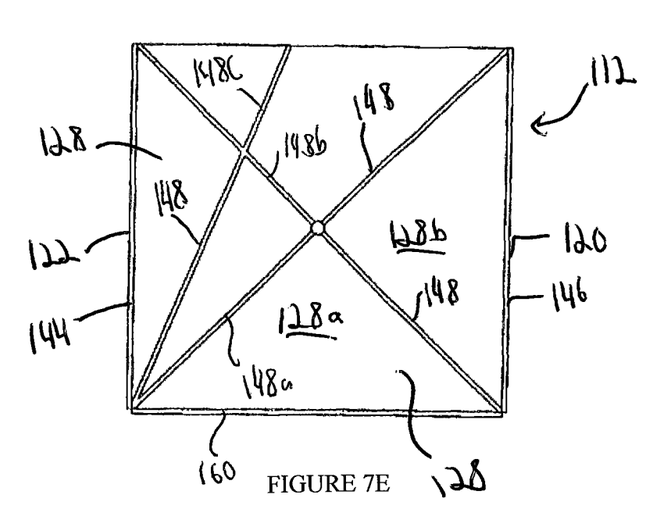
FIG. 7E is a diagram illustrating the right, side view of the sink colander of FIG. 6.
Figure 7F:
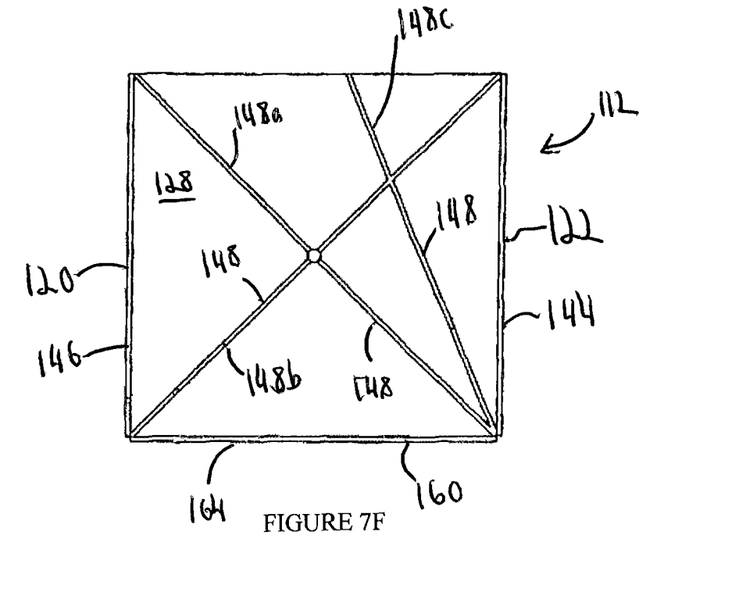
FIG. 7F is a diagram illustrating the left, side view of the sink colander of FIG. 6.
Figure 8A:
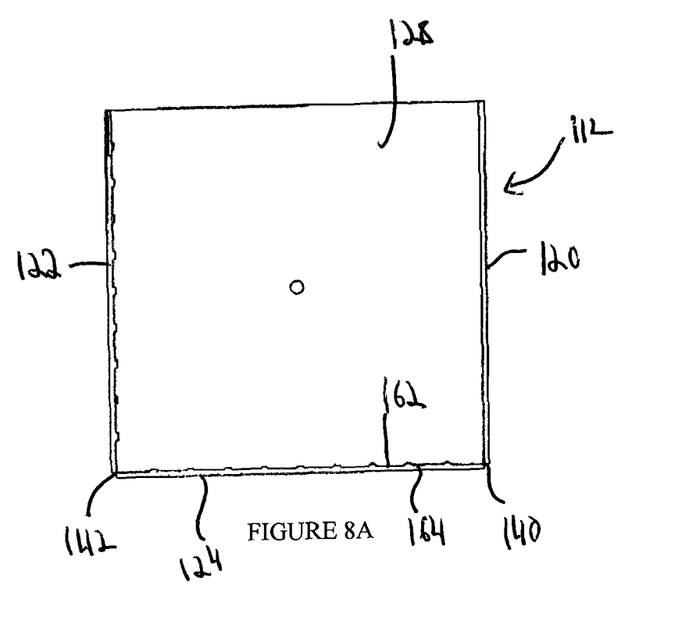
FIG. 8A is a diagram illustrating a cross-sectional view of the sink colander of FIG. 7A along the line 8-8.
Figure 8B:
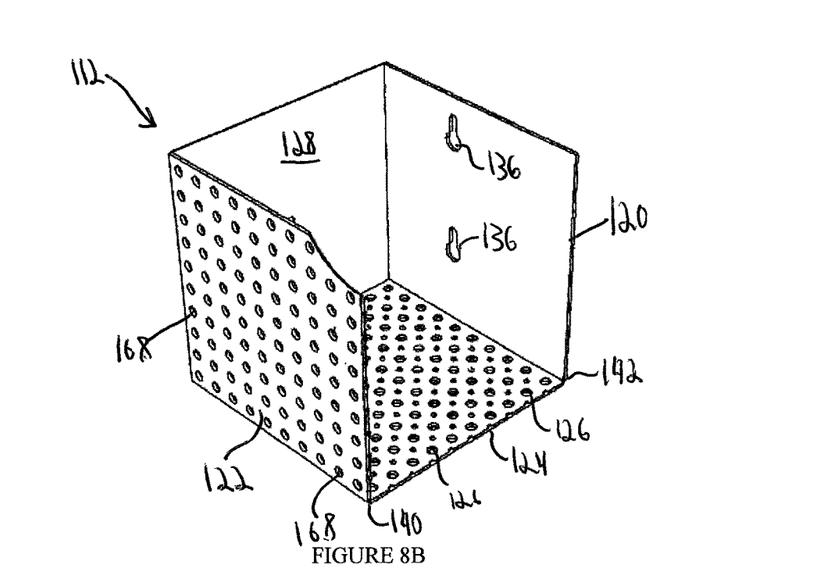
FIG. 8B is a diagram illustrating isometric view of FIG. 8A
Figure 9A:
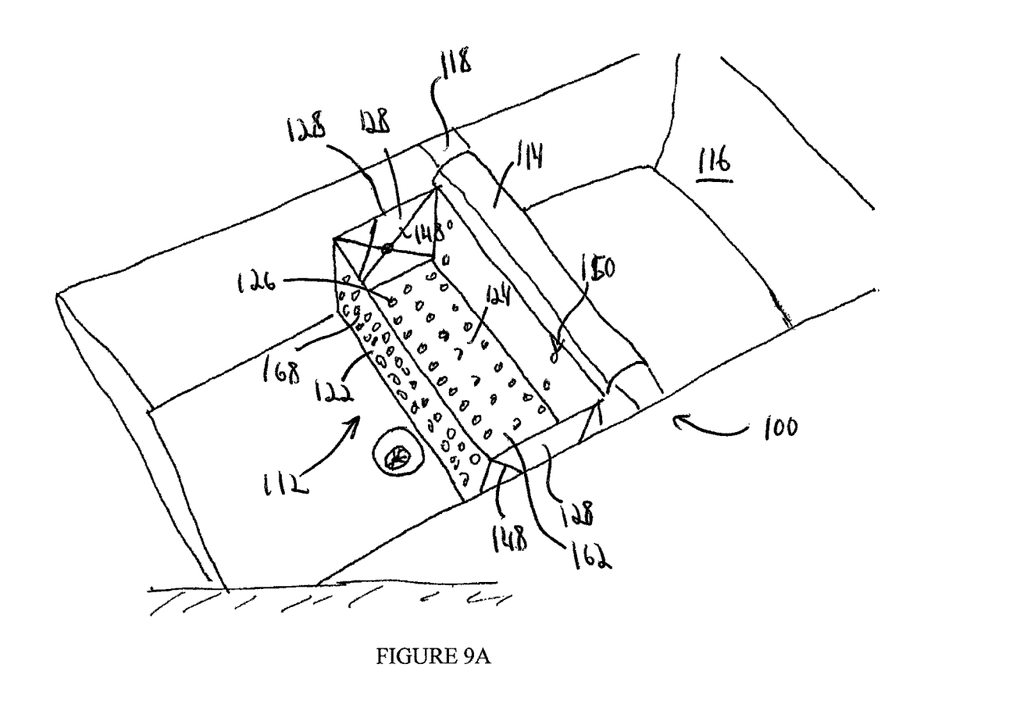
FIG. 9A is a diagram illustrating of an illustrative embodiment of a sink colander attached to a base member positioned in a sink.
Figure 9B:
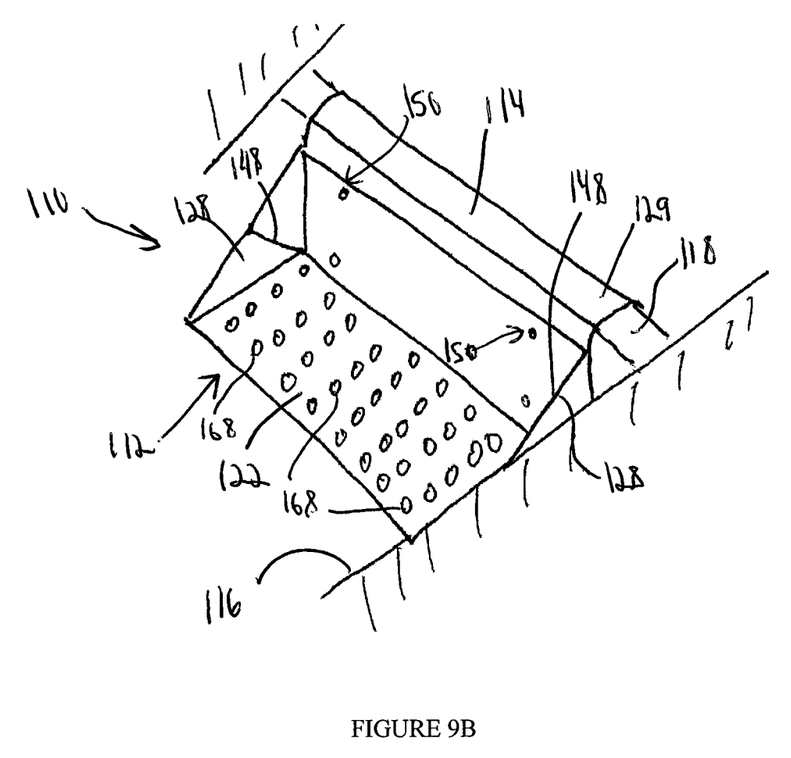
FIG. 9B is a diagram of the sink colander of FIG. 9A folded into a first position
Figure 9C:
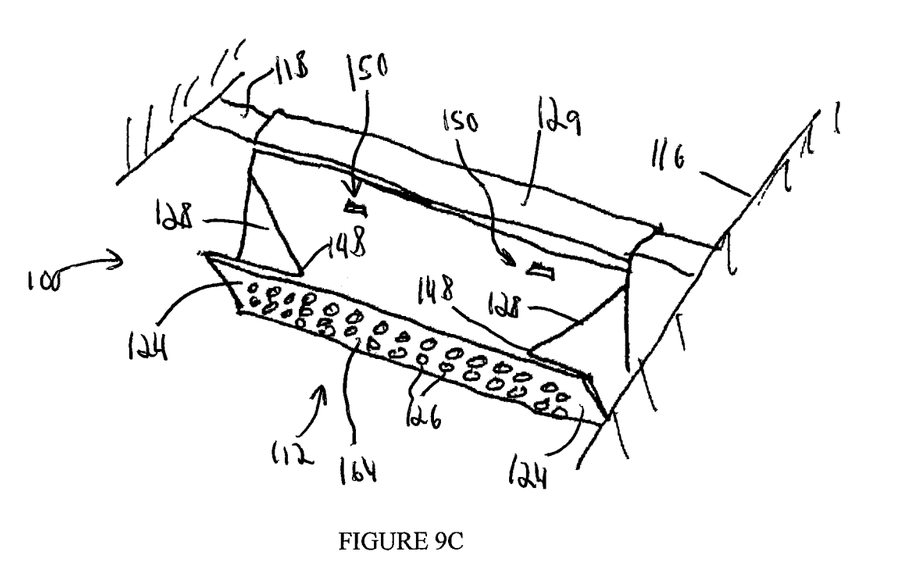
FIG. 9C is a diagram of the sink colander of FIG. 9B being folded into a second position.
Figure 9D:
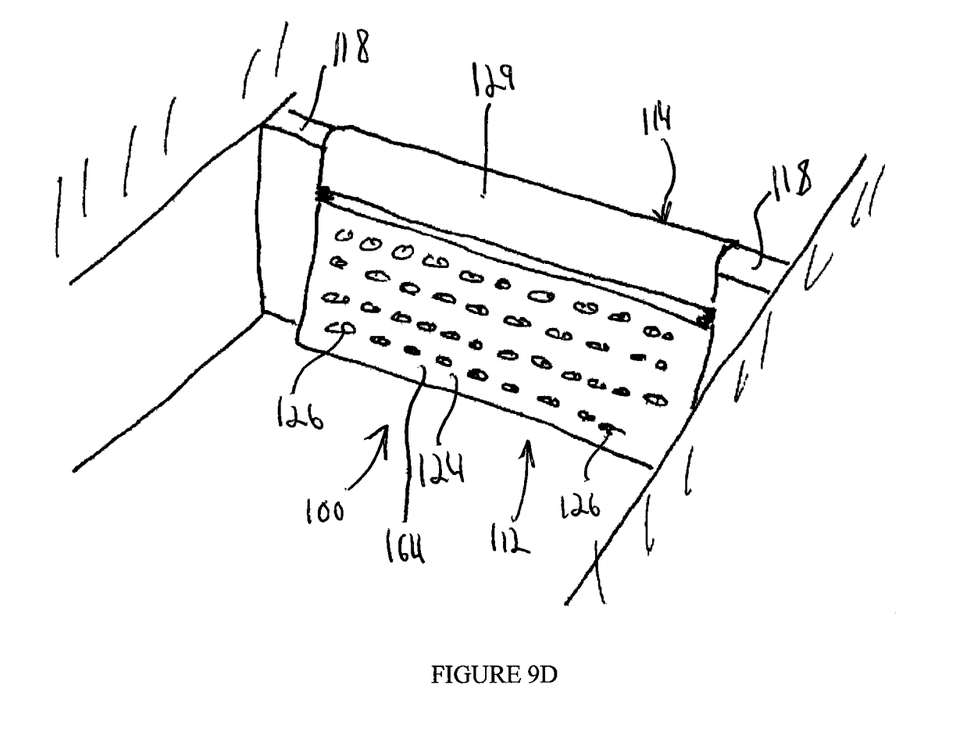
FIG. 9D is a diagram of the sink colander of FIG. 9A folded into a second, collapsed position.
Figure 9E:
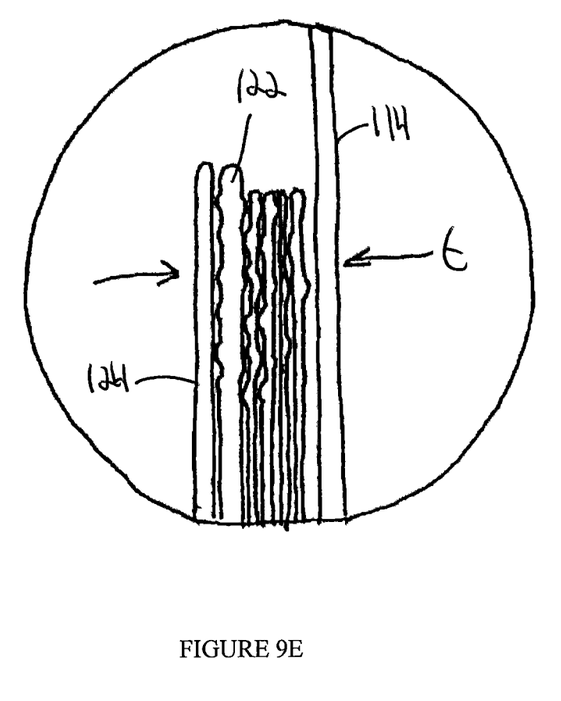
FIG. 9E is a diagram showing a side view of the colander in the second, collapsed position such as illustrated in FIG. 9D.

As illustrated in the embodiments disclosed herein, the side walls 128 of the colander 112 are foldable and/or are otherwise collapsible to facilitate positioning of the colander 112 between the first, second and third positions. The side walls 128, as illustrated, for example, in FIGS. 7E and 7F, are connected to and extend between the back wall 120 and the front wall 122. The side walls 128 each have a first edge 144 connected to the front wall 122 and a second edge 146 connected to the back wall 120. In some embodiments, the side walls 128 include a third edge 160 attached to the bottom wall 124. Additionally, the pair of side walls 128 each have two or more hinges 148 operable to move the front wall 122 between at least the first position 130 (FIG. 9A) and the second position 131 (FIG. 9B). The hinges 148 may be formed by scoring the side walls 128 to create folding lines. Alternatively or in addition, the hinges 148 may be a mechanical hinge that connects one or more pieces of the side walls 128 together. For example, referring to FIG. 7E, the hinge 148 connects the side pieces 128*a* and 128*b*. In one embodiment, there are two hinges or score lines 148 (148*a*, 148*b*) extending diagonally across the side walls 128. In another embodiment, there are three score lines 148 (148*a*, 148*b*, 148*c*) formed in the side walls 128. It should be understood that there may be any number of hinges or score lines formed or attaching aspects of the side walls 128 to allow the colander 112 to collapse between the first, second and third positions, respectively, as illustrated in FIGS. 9A, 9B and 9D.

Other aspects of the colander 112 includes apertures formed therethrough. In one embodiment, the front wall 122 includes apertures 168. The apertures 168 formed in the front wall 122 may form a pattern, extend the entire height of the wall 122 or only the bottom third of the wall 122. In an exemplary embodiment, the apertures 168 will substantially align with the aperture 126 formed in the bottom wall 124 to allow better drainage when the front wall 122 overlays the bottom wall 124 when in the second position. According to some embodiments, the side walls 128 include apertures (not shown). In one embodiment, the apertures formed in the side walls 128 are positioned to align with the apertures 126 and 168 formed in the bottom and front walls 122 and 124, respectively when the colander 112 is in the second position. Furthermore, in some embodiments, the back wall 120 includes apertures for facilitating the drainage of liquids. Additionally, other aspects of the colander 112 may include protrusions like protrusions 166 on other surfaces and walls to help with air and liquid flow therebetween.

In operation, the colander 112 is removable from the sink 116. Alternatively, the colander 112 may be collapsed, for example, into the third or stored position (FIG. 9D). When the colander 112 is collapsed and in the third position, the colander 112 may have a thickness, t, of about 0.2 inches to about 1.5 inches. In one embodiment, the thickness, t, is from about 0.2 inches to about 0.6 inches. In yet another embodiment, the thickness, t, is about 0.5 inches.

The colander 112 may be formed as a single piece by molding. Alternatively, the colander 112 may be formed in multiple pieces and then assembled. It will be appreciated by one with skill in the art that there are several methods for manufacturing and multiple types of materials may be used. In one embodiment, the sidewalls or wings 128 are formed of a softer or more flexible plastic than the back, bottom, and front walls 120, 122, 124, respectively. In another embodiment, the sidewall or wings 128 are formed of an elastomeric plastic and the back, bottom and front walls 120, 122, 124 are formed of metal.

In one method of operation, the colander 112, having the back wall 120, the bottom wall 122, the front wall 124, and the pair of side walls 128 having the two or more folding scores 148 is positioned in the sink 116 in the first position (FIG. 9A), which is also when the colander 112 is in the open position. The colander 112 may be used to receive therein, for example, fruits or vegetables, for rinsing and/or storage thereof. The colander 112 is also positionable in the second position (FIG. 9B), where the front wall 124 is parallel to the bottom wall 122, but perpendicular to the back wall 120. At least one of the folding scores 148 on each of the pair of side walls 128 is bent or otherwise folded, responsive to pushing/rotating the front wall 124 toward the bottom wall 122. In use, the front wall 122 is pushed or otherwise rotated toward the bottom wall 124 until the front wall 122 is adjacent and parallel to the bottom wall 124. In the second position 131, the colander 112 creates a shelf as shown in FIG. 9B. The shelf may be used, for example, to thaw meat, or may be used as a storage device to place soap and other kitchen utensils for later use. Alternatively, the colander 112 may be positioned in the third position and collapsed for space-saving storage (FIG. 9D). When transitioning to the third position, the front and bottom walls 122 and 124 are rotated and otherwise positioned adjacent to and parallel with the back wall 120 (FIG. 9C). In response to such movement, at least another of the folding scores 148 on each of the pair of side walls 128 is bent or otherwise folded to allow the front wall 122 and the bottom wall 124 to move/rotate toward the back wall 120 (FIG. 9C). When in the collapsed position (FIG. 9D), the front wall 122, the bottom wall 124 and the back wall 120 are substantially parallel with each other.

Referring specifically to FIG. 6, the front wall 122 includes a recessed area 140, which acts as a grip to, for example, allow a user to more easily grasp the front wall 122 to transition the front wall 122 from the second position (FIG. 9C) to the first position (FIG. 9B). In the alternative, the recessed area 145 may be replaced with a flap member that can be used to pull the front wall 122 upward from the second position to the first position.

Figure 10A:
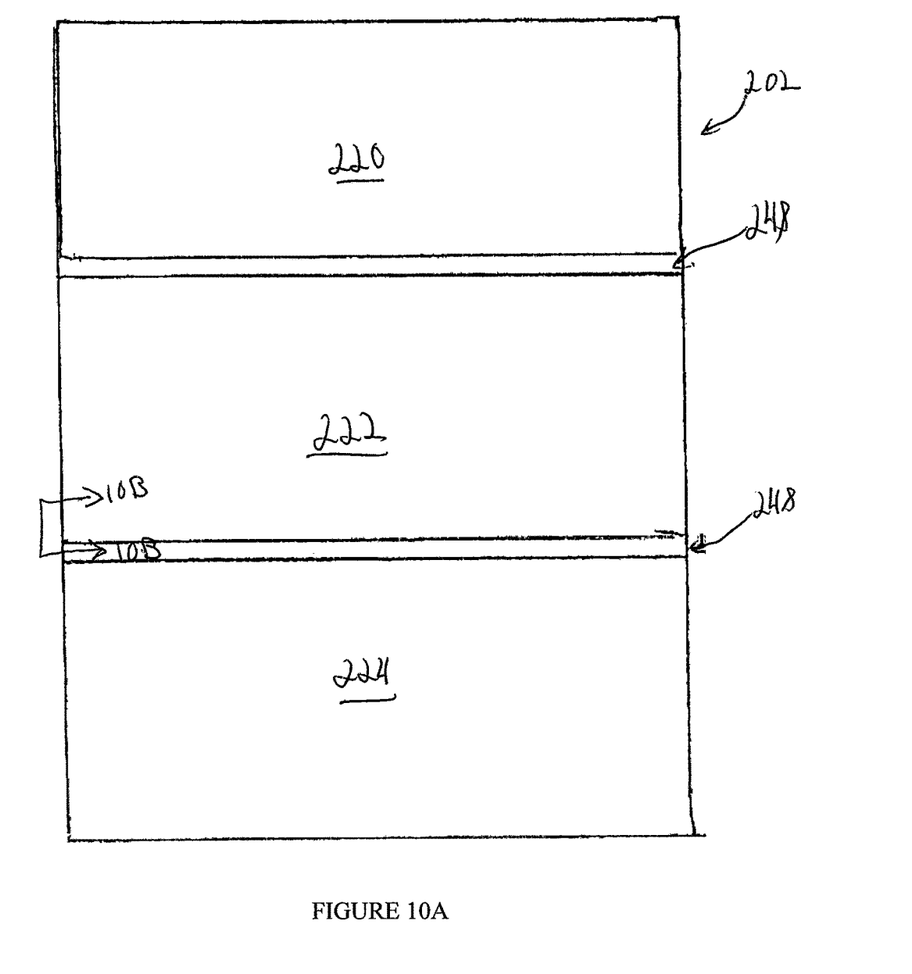
FIG. 10A is a diagram of an embodiment of a colander illustrating the front, bottom, and back walls connected by hinges.
Figure 10B:
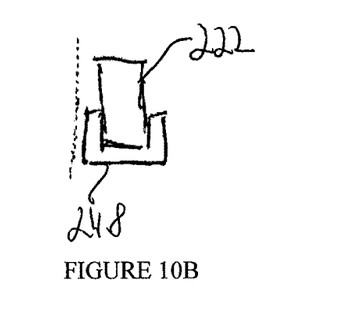
FIG. 10B is a diagram of an embodiment of a hinge used to connect the walls in of the colander illustrated in FIG. 10A.

Referring now to FIGS. 10A-C an embodiment of a colander 202 where the front wall 224, the bottom wall, the back wall 220 and the side walls 228 are connected by hinges 248 is presented. In this embodiment, the front, bottom and back walls 224, 222, 220 are formed of a metal material and the hinge 248 is formed of a polymer. Other materials may be used. Edges of the walls are slid or otherwise inserted into corresponding slots 250 in the hinge 248, as best illustrated in FIG. 10B. The hinges 248 may be removed for cleaning, replacement, or other reasons. The colander 202, including the sidewalls is substantially similar to the colander 112 shown in FIGS. 6-9F.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A collapsible colander, comprising:
a back wall configured to attach to a sink wall;
a front wall opposing the back wall, the front wall moveable between a first position that is parallel to the back wall and a second position that is perpendicular to the back wall;
a bottom wall having a plurality of apertures formed therethrough, the bottom wall having at least a first position that is substantially perpendicular to the back wall; and
a pair of side walls each having a first edge connected to the front wall and a second edge connected to the back wall, the pair of side walls each having two or more hinges operable to move the front wall between at least the first position and the second position.

2. The colander of claim 1, wherein the two or more hinges in each of the side walls is formed by a score in the respective side wall.

3. The colander of claim 1, wherein the two or more hinges in each of the side walls connects a first piece to a second piece of the respective side wall.

4. A The colander of claim 1, wherein the colander is plastic.

5. A The colander of claim 1, wherein each of the side walls has a first side and a second side, respectively, with protrusions extending from at least a portion of the second side.

6. The colander of claim 1, wherein the second position of the front wall is substantially parallel to the bottom wall.

7. A The colander of claim 1, wherein the front wall further comprises apertures formed therethrough.

8. A The colander of claim 7, wherein at least a number of the apertures formed through the front wall substantially align with at least a number of the apertures formed through the bottom wall.

9. A The colander of claim 1, wherein the back wall includes a slot for attaching to a support member positioned between a side wall of a sink and the back wall.

10. A The colander of claim 1, wherein the front wall is moveable into a third position parallel to the back wall, the third position being a collapsed position with the front wall adjacent to the back wall.

11. A The colander of claim 1, wherein the bottom wall has a first side and a second opposing side, and wherein protrusions extend from at least a portion of the first side of the bottom wall to form a space between the front wall and the bottom wall when the front wall is positioned parallel to the bottom wall.

12. A The colander of claim 1, wherein each of the side walls has a first side and a second side, respectively, with protrusions extending from at least a portion of the first side.

13. A method for collapsing a colander, the colander having a back wall, a bottom wall, a front wall, and a pair of side walls having two or more folding scores, the method comprising the following steps:
bending at least one of the folding scores on each of the pair of side walls, responsive to pushing the front wall toward the bottom wall;
positioning the front wall adjacent the bottom wall; and
responsive to the front wall being positioned adjacent the bottom wall, and responsive to pushing the front wall and the bottom wall toward the back wall, bending at least another of the folding scores on each of the pair of side walls;
wherein the front wall, the bottom wall and the back wall are substantially parallel and in a collapsed position.

14. A collapsible colander system for connecting to a sink wall, comprising:
a support member operable to connect to at least a portion of the sink wall;
a collapsible colander comprising:
a back wall attachable to the support member;
a retractable front wall having a plurality of apertures formed therethrough;
a bottom wall having a plurality of apertures formed therethrough, the bottom wall having a first edge attached the back wall and an opposing second edge attached to the retractable front wall; and
a pair of foldable wings connected to and extending between the back wall and the front wall, the wings operable to fold into a second position causing the retractable front wall to be positioned perpendicular to the back wall, and the wings are operable to fold into a third position causing the retractable front wall to be positioned parallel and adjacent to the back wall in a collapsed position.

15. A The system of claim 14, wherein the foldable wings are scored and the wings fold along the scored lines.

16. A The system of claim 14, wherein the foldable wings are formed of a softer material than the back, bottom and front walls.

17. A The system of claim 14, wherein the back, bottom and front walls are molded as a single piece.

18. A The system of claim 14, wherein the foldable wings include at least two score lines and the wings fold along the score lines.

19. A collapsible colander system for connecting to a sink wall, comprising:
a support member operable to connect to at least a portion of the sink wall;
a collapsible colander comprising:
a back wall attachable to the support member;
a retractable front wall having a plurality of apertures formed therethrough;

a bottom wall having a plurality of apertures formed therethrough, the bottom wall having a first edge extending along the back wall and an opposing second edge extending along the retractable front wall; and a pair of foldable side walls connected to and positioned between the back wall and the front wall, the side walls operable to fold from a first position into a second position thereby positioning the front wall into a shelf substantially horizontal to a sink bottom, and a third position wherein the third position is a collapsed position such that the front wall and bottom wall is positioned adjacent to the back wall.

20. A The system of claim 19, wherein the support member includes a plurality of ridges extending from a top surface of the support member, the ridges providing a raised support surface to support an object above and spaced apart from the top surface.

* * * * *